United States Patent

Uchiyama et al.

[15] 3,690,400
[45] Sept. 12, 1972

[54] VEHICLE POWER STEERING CONTROL DEVICE

[72] Inventors: Hiromichi Uchiyama, Tokyo; Naohiko Inoue, Yokohama, both of Japan

[73] Assignee: Nissan Motor Company, Ltd., Kanagawa-ku, Yokohama, Japan

[22] Filed: May 11, 1971

[21] Appl. No.: 142,201

[30] Foreign Application Priority Data

June 1, 1970 Japan .....................45/46597
June 1, 1970 Japan .....................45/46598
Aug. 11, 1970 Japan .....................45/69837

[52] U.S. Cl.................180/79.2 R, 60/52 S, 91/434, 137/625.61, 137/625.66
[51] Int. Cl. ..............................................B62d 5/08
[58] Field of Search......180/79.2 R; 60/52 S; 91/370, 91/371, 372, 373, 434; 137/625.61, 625.66

[56] References Cited

UNITED STATES PATENTS 2,748,881 6/1956 Holley....................180/79.2 R
2,824,550 2/1958 Gribler et al.............91/434 X
2,893,504 7/1959 Jackson.................180/79.2 R
2,896,588 7/1959 Hayner et al. .........137/625.61
2,922,440 1/1960 Hardy et al. .............91/434 X
3,465,842 9/1969 Hruska...................180/79.2 R Primary Examiner—Benjamin Hersh
Assistant Examiner—Leslie J. Paperner
Attorney—John Lezdey

[57] ABSTRACT

A vehicle power steering control device including a reaction assembly which applies a reaction force on the steering wheel that depends on both steering effort and vehicle speed. The device comprises a vehicle speed responsive modulator valve for controlling or modulating a pressure of fluid from a fluid pump in response to a signal from a vehicle speed sensor. Since the pressure of fluid from the fluid pump is proportional to the steering effort on the power cylinder, the output pressure of the modulator valve depends on both steering effort and vehicle speed and is transmitted into a reaction chamber. Thus, for low vehicle speeds, the driver encounters a small resistance in turning the steering wheel and, on the other hand, for high vehicle speeds, a large turning resistance is provided to avoid the danger of too rapid turning of the steering wheel and the road wheels 7 Claims, 6 Drawing Figures

VEHICLE POWER STEERING CONTROL DEVICE

In the past, various types of hydraulic power steering devices have been developed for use on vehicles. In certain of them, a hydraulic reaction assembly is provided which applies a reaction on the steering wheel that is proportional to steering effort, thereby making the vehicle driver aware of variations in the steering effort. Thus, when a large steering effort is required to make a turn, the driver encounters great resistance in turning the steering wheel. However, in devices of this type, reaction applied by the reaction assembly is disadvantageously independent of vehicle speed, so that the driver has no steering feel while driving. Therefore, it has been desired to have the reaction depend also upon vehicle speed such that the resistance in turning the steering wheel increases with vehicle speed. According to this invention, the hydraulic power steering device includes a modulator valve which, in response to vehicle speed, controls or modulates a pressure from fluid pump that is proportional to steering effort. The fluid pressure thus modulated is transmitted into the reaction chamber to apply a proper reaction on the steering wheel.

It is therefore an object of this invention to provide a vehicle power steering control device in which a reaction is applied on the steering wheel that is dependent on vehicle speed as well as steering effort.

It is another object of this invention to provide a vehicle power steering control device provided with a vehicle speed responsive modulator valve the output pressure of which is transmitted to a reaction chamber.

It is a further object of this invention to provide a power steering control device which is simple to construct and reliable in operation.

Figure 1:
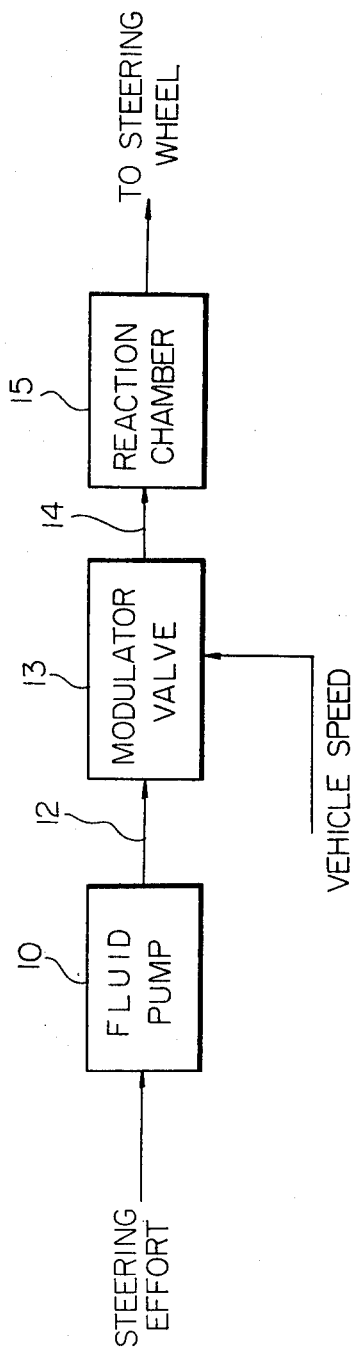
FIG. 1 is a block diagram of a vehicle power steering device embodying this invention.

Referring to the drawings and more particularly to FIG. 1, there is shown a vehicle power steering device of this invention which is generally of the linkage type. Since the power operating portions of the device do not constitute a part of this invention, they have been omitted for the purpose of simplicity. In the figure, reference numeral 10 designates an engine driven fluid pump which, when the engine is running, continuously operates to provide hydraulic pressure to a power cylinder (not shown) through a control valve 11 (shown in FIG. 2). The hydraulic pressure from the fluid pump 10, which is proportional to the steering effort on the power cylinder, is also supplied through a conduit 12 to a modulator valve 13. The modulator valve 13 functions to control the hydraulic pressure in proportion to vehicle speed, providing pressure regulated in dependence on both steering effort and vehicle speed. The regulated pressure is then admitted through a conduit 14 into a reaction chamber 15 in the control valve, in order to apply a reaction on the steering wheel (not shown) that is proportional to the regulated pressure and accordingly also to both steering effort and vehicle speed. It is to be noted that the modulator valve 13 is so constructed that as vehicle speed rises, the output pressure proportionally increases. Thus, for low vehicle speeds, the driver encounters a small resistance in turning the steering wheel and, on the other hand, for high speeds, a greater turning resistance is provided to minimize the danger of too rapid turning of the steering wheel and too sharp turn of the vehicle.

Figure 2:
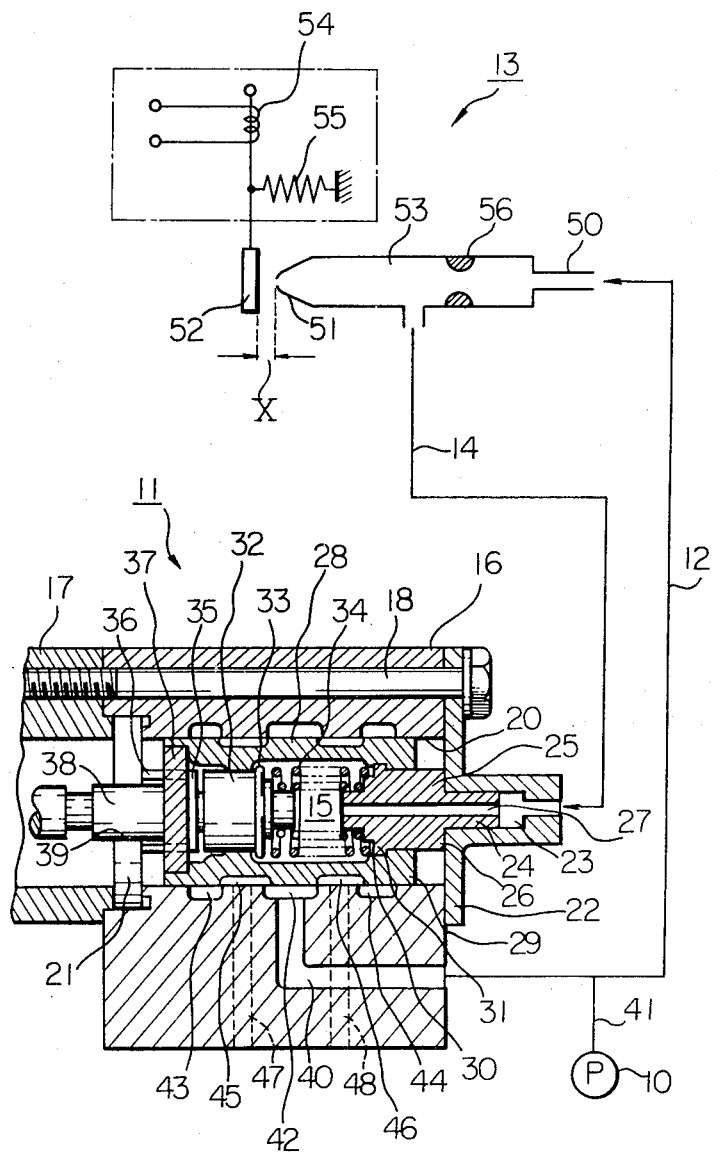
FIG. 2 is a schematic longitudinal section view of a control valve and modulator valve employed in the system of FIG. 1.

In FIG. 2, there is illustrated the general construction of the control valve 11 and the modulator valve 13 of this invention. The control valve 11 includes a valve body 16 fixedly supported in a partially shown shifter housing 17 by means as a bolt 18, which housing in turn is securely mounted on a cross rod (not shown). Although not shown, a pair of steering links are suitably connected with the cross rod so that axial movement of the cross rod will cause a pair of ground-engaging wheels to turn.

The valve body 16 is provided with a longitudinal central bore 20, one end of which is closed by a closure member 21 disposed between the valve body 16 and the shifter housing 17. The opposite end of the bore 20 is closed by means of another closure member 22 which is fixedly supported against the end wall of the valve body 16 by the bolt 18. The closure member 22 is formed with a central bore 23 adapted to slidably receive a small diameter portion 24 of a spring seat 25. The spring seat 25 has a shoulder 26 acting as a stopper, which is normally in abutment with the inner wall of the closure member 22. The spring seat 25 is formed also with an axial passageway 27.

A hollow valve spool 28 is slidably mounted in the valve body bore 20 and has its right-hand end portion 29 slidably receiving therein a large diameter portion of the spring seat 25. An annular notch 30 is internally formed near the right-hand end 29 of the valve spool 28 to slidably receive a stopper flange 31 of the spring seat 25. With this arrangement, movement of the valve spool 28 in a leftward direction as viewed in FIG. 2 causes the spring seat 25 to move in the same direction.

Another spring seat 32 is slidably mounted in the valve spool 28 and has a flange 33 acting as a stopper. The reaction chamber 15 is in the valve spool 28 between the spring seats 25 and 32, in which a plurality of coiled springs 34 are mounted also between the spring seats 25 and 32. The coiled springs 34 are so preloaded as to urge the spring seats 25 and 32 away from each other. Positioned on the left side of the spring seat 32 is a pedestal 35 provided with a plurality of legs 36 which slidably extend through openings formed in a plug 37 formed integrally with the valve spool 28. The legs 36 of the pedestal 35 are adapted to rest upon the inner wall of the closure member 21. An operating rod 38 which is operatively associated with the steering wheel (not shown) slidably extends through an opening 39 centrally formed in the closure member 21, and is operatively connected with the plug member 37 so as to move the valve spool 28.

The valve body 16 is provided with a fluid inlet passage 40 which is connected by a conduit 41 with the fluid or oil pump 10 so that fluid under pressure will flow from the pump 10 into the passage 40. The passage 40 communicates at its outlet end with an annular groove 42 formed in the valve body bore 20. Also provided in the valve body 16 on both sides of the annular groove 42 are annular grooves 43 and 44 which are adapted to be communicated through suitable passages (not shown) with a fluid reservoir or sump (not shown). These annular grooves 43 and 44 have the same width and are equally spaced from the annular groove 42.

The valve spool 28 is provided with a pair of spaced annular grooves 45 and 46 in the outer wall thereof which are adapted to communicate with passages 47 and 48 provided in the valve body 16, which passages in turn lead to opposite ends of a power cylinder having a piston and a rod (not shown).

In the operation of the control valve 11 shown in FIG. 2, when the operating rod 38 is moved to the right by rotation of the steering wheel, the valve spool 28 also is moved to the right causing the spring seat 32 to move in the same direction and to further compress the coiled springs 34. This spool movement will cause the pressure passage 40 to communicate with the left-hand groove 45 of the valve spool 28 while the groove 45 is isolated from the groove 43 leading to the fluid reservoir. Thus, fluid under pressure flows into the cylinder on the left side thereof, causing the piston to move to the right. It follows that the valve body 16 is moved to the right so that the vehicle wheels are caused to turn to the left. When the valve spool 28 moves to the left, the spring seat 25 is moved with the valve spool 28 in the same direction, further compressing the coiled springs 34. At this time the right-hand groove 46 of the valve spool 28 is communicated with the pressure passage 40 and is simultaneously isolated from the groove 44 leading to the fluid reservoir. Thus, fluid under pressure will flow through the passage 48 into the cylinder on the right side thereof, moving the piston to the left. This causes the valve body 16 to move to the left, so that the vehicle wheels are caused to turn to the right.

The conduit 12 is branched off from the conduit 41 leading from the fluid pump 10 and is connected to the inlet port 50 of the modulator valve 13. The modulator valve 13 is of the nozzle-flapper type in which the spacing between a nozzle tip 51 and a flapper 52 is varied in accordance with an input current to thereby modulate hydraulic pressure fed to the nozzle 53. In this embodiment, the input current is adapted to correspond in magnitude proportionally to vehicle speed and is obtained from a conventional vehicle speed sensor (not shown) of the type comprising an a.c. generator having its rotor drivably connected with, for example, the output shaft of a transmission. The a.c. current generated by the a.c. generator is properly processed to provide a d.c. current corresponding to vehicle speed, which is then applied to a torque motor 54 so as to move the flapper 52 closer to the nozzle tip 51 in proportion to vehicle speed against the action of a spring 55. As shown, the hydraulic pressure from the fluid pump 10 is supplied through the conduit 12 and enters the nozzle 53 through an orifice 56. Thus, it is to be understood that the pressure is modulated in proportion to vehicle speed, so that the output pressure of the modulator valve 13 depends both on steering load and on vehicle speed. The hydraulic pressure thus modulated is transmitted through the conduit 14 into the central bore 23 of the closure member 22 and enters the reaction chamber 15 through the axial passageway 27 formed in the spring seat 25. As described above, when the valve spool 28 is moved in one direction or another, the coiled springs 34 are further compressed by either one of the spring seats 25 and 32, as a result, a reaction corresponding to the compression force of the coiled springs 34 is applied on the steering wheel through the operating rod 38. In addition to this spring compression force, the hydraulic pressure in the reaction chamber 15 that depends on both steering load and vehicle speed is applied to the steering wheel to provide a reaction. Thus, it should be understood that a resistance to turning of the steering wheel corresponds in magnitude to the sum of the spring compression force and the hydraulic pressure. Accordingly, it is to be appreciated that with this arrangement the reaction depends not only upon the steering effort on the vehicle wheels, but also upon vehicle speed in such a manner that the reaction increases with vehicle speed. For low vehicle speeds, the driver encounters a small resistance in turning the steering wheel and, on the other hand, for high vehicle speeds, the turning resistance is great enough to avoid the danger of too rapid turning of the steering wheel and too sharp turn of the vehicle.

Figure 3:
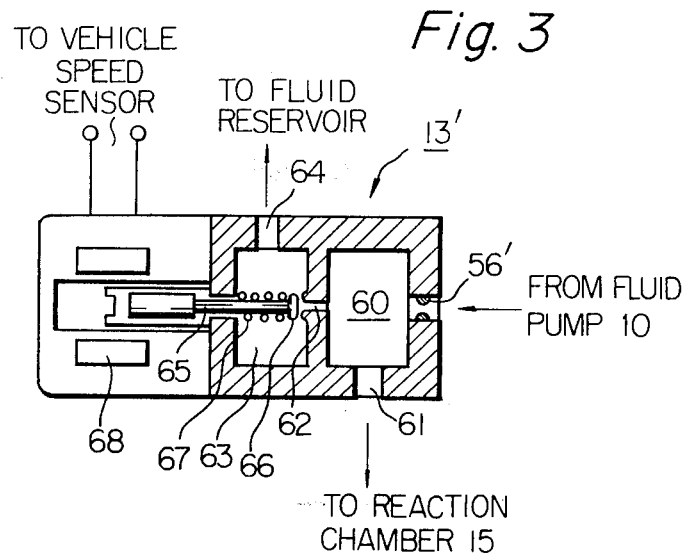
FIG. 3 is a schematic view of a modified modulator valve for use in the system of FIG. 1.
Figure 4:
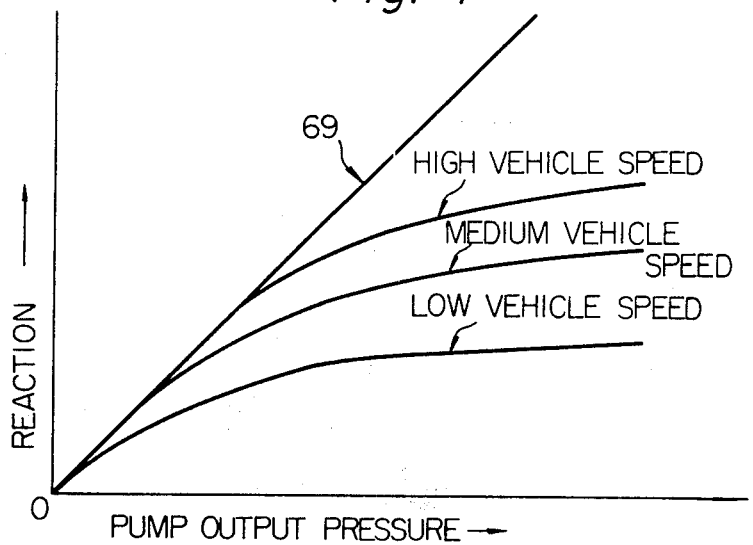
FIGS. 4 and 5 are plots showing typical operating characteristics of the present power steering device.
Figure 5:
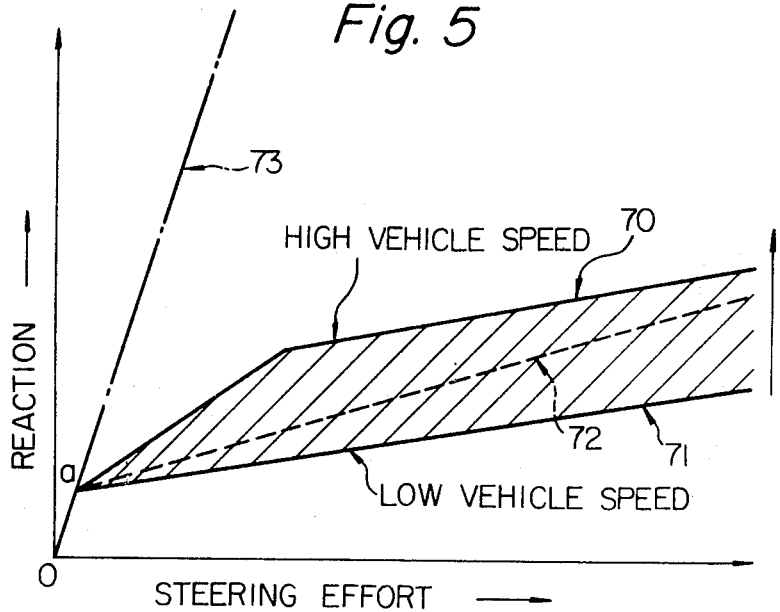

In FIG. 3, there is shown a modification of the modulator valve to be used in the present power steering device. The modulator valve 13' is of the poppet type and comprises a pressure control chamber 60 into which the hydraulic pressure from the fluid pump 10 is introduced through an orifice 56'. The pressure control chamber 60 has an outlet port 61 which is adapted to be connected with the reaction chamber 15. The pressure control chamber 60 also has a pressure-modulating port 62 opening to another chamber 63 which communicates through a drain port 64 with the fluid reservoir. A plunger 65 is provided having its head tip 66 facing the pressure-modulating port 62 and adapted to close it. The plunger 65 has a coiled spring 67 therearound and is axially slidable by energization of a solenoid coil 68 which in turn is adapted to be connected to the vehicle speed sensor to receive therefrom a d.c. current proportional to vehicle speed. The coiled spring 67 is so preloaded as to slide the plunger 65 causing the tip 66 to close the pressure modulating port 62. The solenoid coil 68 is also arranged to apply a pushing and sliding force to the plunger 65, which force increases in proportion to vehicle speed. It will be understood that the fluid spouting from the pressure-modulating port 62 applies a retracting force to the plunger 65. Thus, in operation, the plunger 65 is held in a position where a balance is obtained of an electromagnetic plunger pushing force developed by the solenoid coil 68 and a spring force also urging the plunger 65 to the right in FIG. 3 with a plunger retracting force exerted by the spouting fluid. Accordingly, in this embodiment also, the output pressure of the modulator valve 13' is related both to steering effort and vehicle speed. FIG. 4 shows a plot of reaction applied on the steering wheel against pump output pressure, where the poppet type modulator valve 13' of FIG. 3 is employed to control the output pressure in accordance with vehicle speed. In the plot, the straight line 69 represents the case where the d.c. input current is infinite, which means that the pump output pressure that is proportional to steering effort is applied directly to the reaction chamber 15 without being modulated by the modulator valve 13' since the pressure-modulating port 62 is closed by the plunger 65. As will be readily apparent from the plot, the reaction increases as vehicle speed rises. Furthermore, with the modulator valve 13' as described, the reaction changes according to steering effort at high and low vehicle speeds as exemplified by solid lines 70 and 71, respectively, in FIG. 5. In the plot, the broken line 72 represents the reaction applied by a conventional reaction assembly that is proportional to steering effort, and the dash-and-dot line 73 the reaction encountered by a manual steering device. It is to be understood that the reaction obtainable at different vehicle speeds can be varied within a range as represented by the hatched area by changing the spring constant of the coiled springs 34 mounted in the reaction chamber 15 and the spring 67 around the plunger 65.

Figure 6:
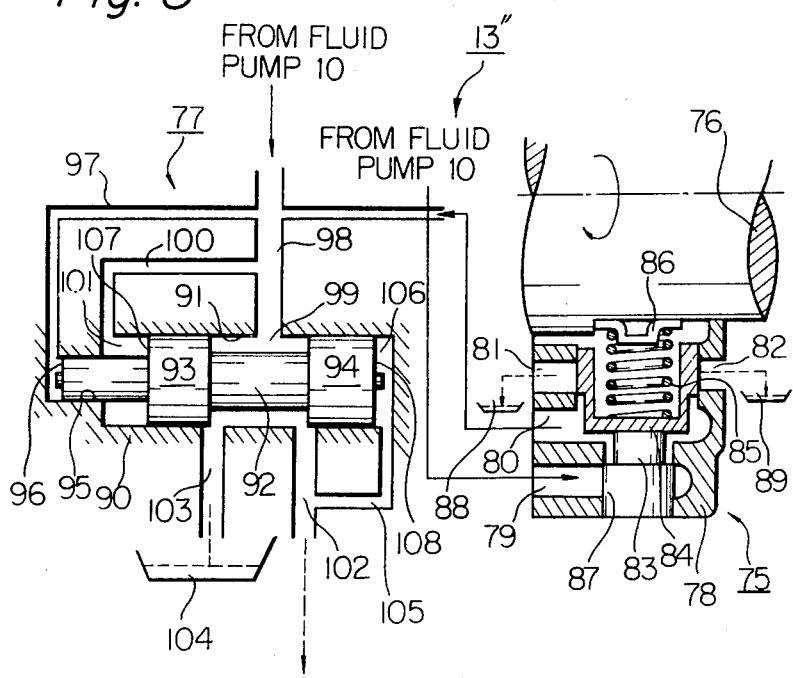
FIG. 6 is a schematic view of another modification of the modulator valve to be used in the system of FIG. 1.

In FIG. 6, there is shown another modification of the vehicle speed-responsive modulator valve. The modulator valve 13'' comprises a first valve 75 operatively associated with the transmission output shaft 76 to provide a pressure signal proportional to vehicle speed and a second valve 77 for controlling the pump output pressure in response to the pressure signal. The first valve 75 is of conventional type comprising a valve body 78 which is fixedly mounted on the transmission output shaft 76 and rotatable with shaft 76. The rotatable valve body 78 has provided therein an inlet port 79, an outlet port 80 and drain ports 81 and 82. A valve member 83 is slidably mounted in the valve body 78 to rotate with the valve body and output shaft 76 to control fluid communication between the ports 79 to 80 in accordance with the centrifugal force exerted thereon. As shown, the rotatable member 83 is secured to a U-shaped member 84 which is suspended by a coiled spring 85 from a spring support 86 mounted on the output shaft 76. When the output shaft 76 rotates, the U-shaped member 84 and the valve member 83 are urged further away from the output shaft 76, causing a land 87 of the valve member 83 to further open the inlet port 79. As vehicle speed rises, fluid communication between the inlet port 79 and outlet port 80 increases to provide a larger output pressure. At low vehicle speeds, the fluid entering the first valve 75 is discharge through the drain ports 81 and 82 into fluid reservoirs 88 and 89, respectively.

The second valve 77 includes a valve body 90 provided with a bore 91 in which a valve spool 92 having two spaced lands 93 and 94 thereon is slidably mounted. The valve body 90 is also provided with a small bore 95 concentric with the bore 91, which is adapted to slidably receive the left-hand end extension 96 of the valve spool 92. The signal pressure from the first valve 75 is introduced through a conduit 97 into the bore 95 to exert a force on the left-hand end extension 96 of the valve spool 92 so as to urge it to the right. A relatively large passage 98 is provided in the valve body 90 to allow the fluid from the pump 10 to enter the space 99 between the spaced lands 93 and 94. A small passage 100 is also branched off from the passage 98 and is communicated with the left-hand end space 101 in the bore 91. An outlet passage 102 to be connected with the reaction chamber 15 (FIG. 2) is so positioned that fluid communication between chamber 15 and the space 99 between the spaced lands 93 and 94 increases as the valve spool 92 moves to the right. On the other hand, a drain passage 103 leading to a fluid reservoir 104 is provided in such a position that fluid communication between reservoir 104 and the space 99 decreases as the valve spool 92 moves to the right. A small passage 105 is also provided to communicate the right-hand end space 106 with the outlet passage 102.

In operation, the valve spool 92 is biased to the right by signal pressure exerted on the left-hand end face of extension 96 thereof transmitted through the conduit 97 and by a pressure routed through the small passage 100 exerted on the left-hand face 107 of the land 93. The spool 92 is also biased to the left by a pressure routed through the passage 105 exerted on the right-hand face 108 of the land 94. Thus, as the signal pressure increases with vehicle speed, the valve spool 92 is moved to the right, so that the land 93 tends to block the drain passage 103 while the land 94 tends to open the outlet passage 102, with the resulting increase in the output pressure to be transmitted to the reaction chamber 15.

As has been described above, this invention provides an improved power steering control device for use in vehicles which device provides a proper reaction on the steering wheel in dependence on both the steering effort and the vehicle speed.

What is claimed is:

1. A hydraulic power steering device for use on vehicle, comprising a fluid pressure and flow control valve, a valve body having a bore therein, a hollow valve spool slidably disposed in said valve body bore, said valve spool being operatively associated with a steering wheel, two spring seats slidably disposed within said hollow valve spool and forming a reaction chamber between said seats, each of said spring seats having a flange peripherally formed thereon acting as a stopper, spring means mounted in said reaction chamber between said spring seats, said spring means being so preloaded as to urge said spring seats away from each other, said valve body having a first passage adapted to be connected to a fluid pump and communicating at its outlet end with a first annular groove formed in said valve body bore having formed a second annular groove and a third annular groove spaced on both sides of said first groove, said second annular groove and said third annular groove being adapted to be connected to a fluid reservoir through a second passage and a third passage, respectively, a power cylinder having a piston and a rod and connected at one end to a fourth passage and at the other end to a fifth passage, said valve spool having a fourth annular groove and a fifth annular groove therein adapted to selectively connect said first passage with said fourth passage and said fifth passage, respectively, to control fluid flow through said control valve to said power cylinder in response to movement of said valve spool relative to said valve body in either direction, a modulator valve for controlling a pressure from said fluid pump in proportion to vehicle speed and passage means connecting said modulator valve to said reaction chamber in said control valve wherein the reaction applied to the steering wheel by said control valve corresponds to the sum of the hydraulic pressure in said reaction chamber and the force of said spring means and therefore depends upon steering effort on said power cylinder and also upon vehicle speed.

2. A hydraulic power steering device according to claim 1, in which the reaction applied to the steering wheel increase with vehicle speed.

3. A hydraulic power steering device according to claim 1, in which one of said spring seats has a small diameter portion which is slidably received in a bore formed in a closure member mounted on one end of said valve body.

4. A hydraulic power steering device according to claim 3, in which said one spring seat has an axial passageway through which the hydraulic pressure from said modulator valve is introduced into said reaction chamber.

5. A hydraulic power steering device according to claim 1, in which said modulator valve is of the conventional nozzle-flapper type comprising a nozzle having an inlet port connected through a conduit having an orifice to said fluid pump and an outlet port to said reaction chamber, a torque motor electrically connected to a vehicle speed sensor to receive a d.c. current proportional to vehicle speed, and a spring for normally urging a flapper away from the nozzle tip so as to open it.

6. A hydraulic power steering device according to claim 1, in which said modulator valve is of the conventional poppet type having a pressure control chamber into which the hydraulic pressure from said fluid pump is introduced through a constriction, said chamber having an outlet port connected to said reaction chamber and a pressure-modulating port connected to said fluid reservoir, a plunger having its tip portion facing said pressure-modulating port so as to close it, a spring around said plunger, and a solenoid operatively associated with said plunger so as to move it in response to a d.c. current proportional to vehicle speed and supplied to the coil of said solenoid.

7. A hydraulic power steering device according to claim 1, in which said modulator valve comprises a first valve operatively associated with the transmission output shaft so as to provide a signal pressure corresponding to vehicle speed, said first valve comprising a valve body fixedly mounted on, and rotatable with a driven shaft of said vehicle, said valve body having an inlet port connected to said fluid pump, an outlet port through which said signal pressure is provided, and drain ports connected to said fluid reservoir, a valve member slidably mounted in said valve body, a U-shaped member carrying said valve member and suspended by spring means from the transmission output shaft, said valve member having a land adapted to control fluid communication between said inlet port and said outlet port in response to centrifugal force exerted thereon by rotation of the transmission output shaft, a second valve for controlling a fluid pressure delivered from said fluid pump in response to said signal pressure from said first valve, said second valve comprising a valve body having a bore therein, a valve spool slidably disposed in said valve body bore and having spaced lands provided thereon, a small bore concentric with said valve body bore and adapted to slidably receive an extension of said valve spool, said valve body having a first passage adapted to be connected to the outlet port of said first valve and communicating with said small bore of said valve body, a second passage adapted to be connected to said fluid pump and communicating with the space between said spaced lands, a third passage adapted to be connected to said fluid pump and communicating with one end space of said valve body bore, a fourth passage adapted to be connected to said reaction chamber and communicating with the other end space of said valve body bore, a fifth passage adapted to be connected to said reaction chamber and positioned such that fluid communication between said reaction chamber and the space between said spaced lands increases as said valve spool moves in one direction, a sixth passage adapted to be connected to said fluid reservoir and positioned such that fluid communication between said reservoir and the space between said spaced lands decreases as said valve spool moves in said one direction, said valve spool being biased in said one direction by said signal pressure exerted on said end thereof transmitted through said first passage and by a pressure transmitted through said third passage to said one end space of said valve body bore, said valve spool being also biased in the opposite direction by a pressure transmitted through said fourth passage to the other end space of said valve body bore, wherein a pressure transmitted through said fifth passage to said reaction chamber depends upon steering effort as well as upon vehicle speed.

* * * * *